(12) United States Patent
Streicher et al.

(10) Patent No.: US 6,887,372 B2
(45) Date of Patent: May 3, 2005

(54) PORTABLE DRILLING WATER FILTER WITH SELF-CLEANING SYSTEM

(75) Inventors: Harald Streicher, Pürgen-Stoffen (DE); Franz Wenzl, Augsburg (DE); Peter Ostermeier, Diessen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/694,552

(22) Filed: Oct. 27, 2003

(65) Prior Publication Data

US 2004/0129652 A1 Jul. 8, 2004

(30) Foreign Application Priority Data

Nov. 9, 2002 (DE) .......................................... 102 52 194

(51) Int. Cl.$^7$ ........................ B01D 29/64; B01D 29/66; B01D 35/02
(52) U.S. Cl. ...................... 210/107; 210/108; 210/238; 210/411; 210/413; 210/415; 210/470
(58) Field of Search ................................ 210/791, 798, 210/805, 107, 108, 408, 409, 411, 413, 170, 747, 251, 797, 237, 238, 415, 470

(56) References Cited

U.S. PATENT DOCUMENTS

| | | | | |
|---|---|---|---|---|
| 663,361 A | * | 12/1900 | Phelan .......................... 99/450 |
| 1,097,415 A | * | 5/1914 | Foss ............................ 210/470 |
| 1,377,684 A | * | 5/1921 | Hollands ..................... 210/245 |
| 2,731,155 A | * | 1/1956 | James ......................... 210/470 |
| 3,680,706 A | * | 8/1972 | Baer et al. .................. 210/238 |
| 3,849,312 A | * | 11/1974 | Wecker, Sr. ................. 210/237 |
| 4,042,504 A | * | 8/1977 | Drori ........................ 210/107 |
| 4,207,631 A | * | 6/1980 | Baggey ........................ 4/286 |
| 4,669,167 A | * | 6/1987 | Asterlin ..................... 29/426.6 |
| 5,820,753 A | * | 10/1998 | Mayer ........................ 210/232 |
| 5,897,787 A | * | 4/1999 | Keller ........................ 210/767 |
| 6,007,714 A | * | 12/1999 | Keith ......................... 210/169 |
| 6,180,017 B1 | * | 1/2001 | Usher ......................... 210/791 |

FOREIGN PATENT DOCUMENTS

| | | |
|---|---|---|
| DE | 9723798 | 12/1998 |
| DE | 0110244 | 4/2002 |

* cited by examiner

Primary Examiner—Robert James Popovics
(74) Attorney, Agent, or Firm—Sidley Austin Brown & Wood, LLP

(57) ABSTRACT

A drilling water filter (1) with a self-cleaning system including a filter container (2), a cover (3) and a filter element (6) that can be inserted in the flow arm between an inlet (4) and an outlet (5) for separation of solid material from the fluid. The cover (3) has a displaceable carrying handle (7) for transporting the drilling water filter. The carrying handle (7) is connected with at least one self-cleaning means, in a controlled manner.

7 Claims, 2 Drawing Sheets

PORTABLE DRILLING WATER FILTER WITH SELF-CLEANING SYSTEM

BACKGROUND OF THE INVENTION

Figure 1:
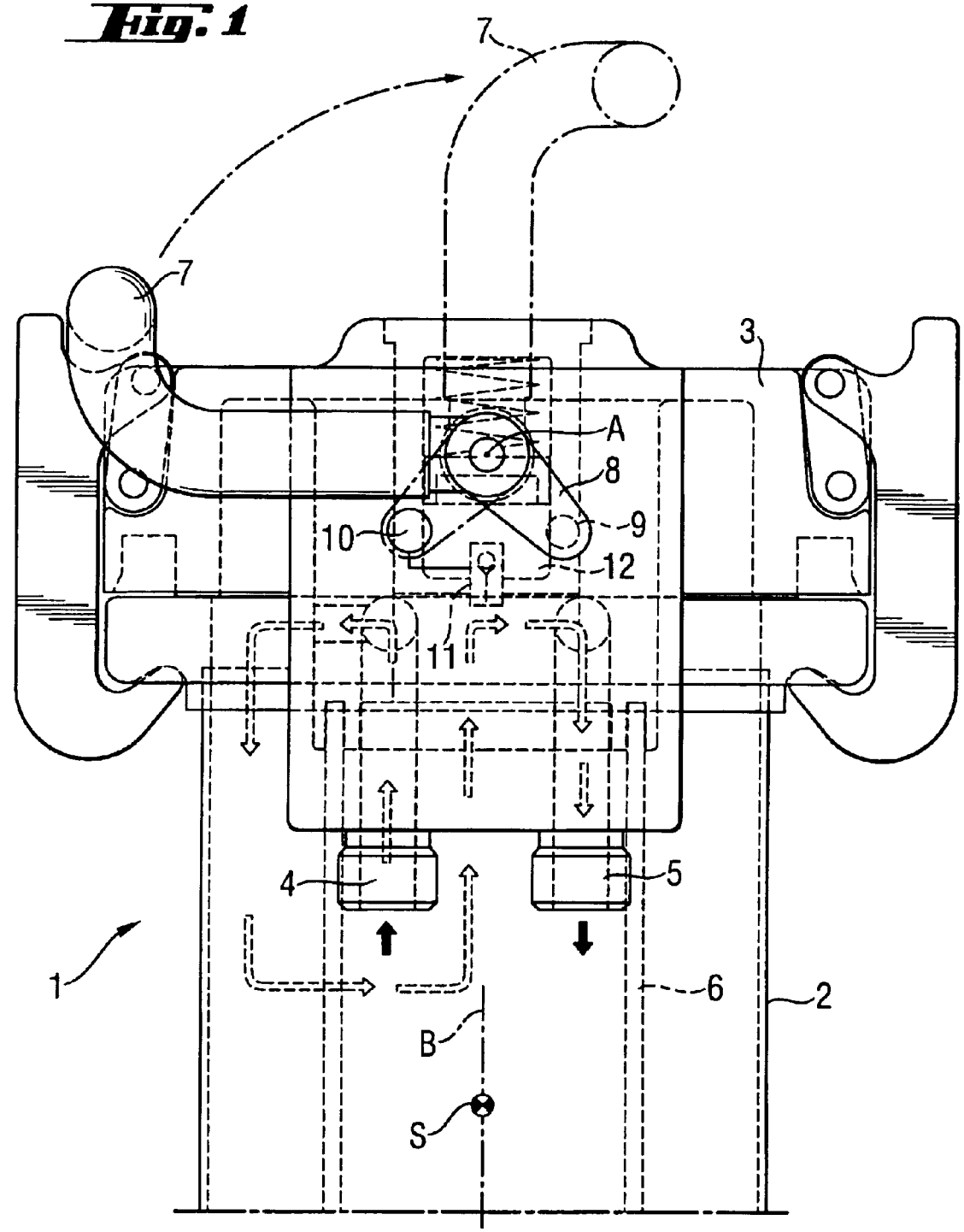

The invention relates to a portable drilling water filter with a self-cleaning system.

According to DE 20110244U1, drilling water pumps take up water, which is heavily contaminated with solid material, at low pressure borehole and provide at separate outflows both filtered water and borehole water with heavily concentrated solid material under higher pressure. Regular back flushing of the drilling water filter is necessary because of the heavy concentration of solid material in the borehole water to prevent permanent accumulation of same.

According to DE 19723798, a back flushing, cylindrical ceramic filter cartridge has a coaxial rotational brush on the outside of the cylinder sleeve, said brush having inward oriented bristles for mechanical cleansing that are driven directly by the through-flowing drilling water or by a separate motor. The rotary driving by virtue of the through-flowing drilling water is too weak for waters that are heavily contaminated with solid material; a separate motor, on the other hand, is technologically costly.

SUMMARY OF THE INVENTION

The object of the invention is to provide a technologically simple embodiment of a portable drilling water filter with an automatic self-cleaning system.

This object is achieved by a drilling water filter, in a filter holder having a cover, having a filter element that can be inserted in the flow arm between an inflow and an outflow for separating solid material from the fluid, wherein the cover has a displaceable carrying handle for transporting the drilling water filter, which is regulated using at least one self-cleansing means.

The self-cleaning operation is effected by reversing the drilling water filter using the displaceable carrying handle that is connected with self-cleansing means, whereby in the rough building trades this occurs automatically in discontinuous intervals.

Advantageously, the carrying handle can be pivoted away from the center of gravity of the drilling water filter, whereby upon reversal of the drilling water filter, the gravity triggers the self-cleaning operation.

Advantageously, the carrying handle is a rotationally pivoting stirrup handle, wherein a rotary shift can be engaged on the carrying handle axis.

Advantageously, a non-rotational controlling means is connected with the carrying handle axis, which is connected with at least one self-cleansing means, whereby the control information is present in the cover zone.

Advantageously, a permanent magnet is arranged in the controlling means, whose adjacent Hall sensor effects, via an electrically controlled back-flush valve, a back-flushing of the filter element with fluid from the pressure biased back-flush chamber, whereby the control information for back-flushing can be tapped in a non-contact manner.

Advantageously, the controlling means has a driving means, in the form of a spring biased detent mechanism that mechanically rotationally and in a displacing manner engages in the circumferential detent recesses of a rotationally displaceable cleansing means, whereby the mechanical cleansing is directly effected mechanically.

Advantageously, the cleansing means is configured as a coaxially rotating brush on the external cylinder sleeve of the filter elements, whose bristles are inwardly oriented, whereby solid materials are efficiently removable at the filter element.

Advantageously, upon reversal of the drilling water filter, the carrying handle is stepwise displaced, whereby, in a first step, a mechanical cleansing is effected and, in a second step, a back-flushing is effected, whereby an effective self-cleaning occurs.

BRIEF DESCRIPTION OF THE INVENTION

Figure 2:
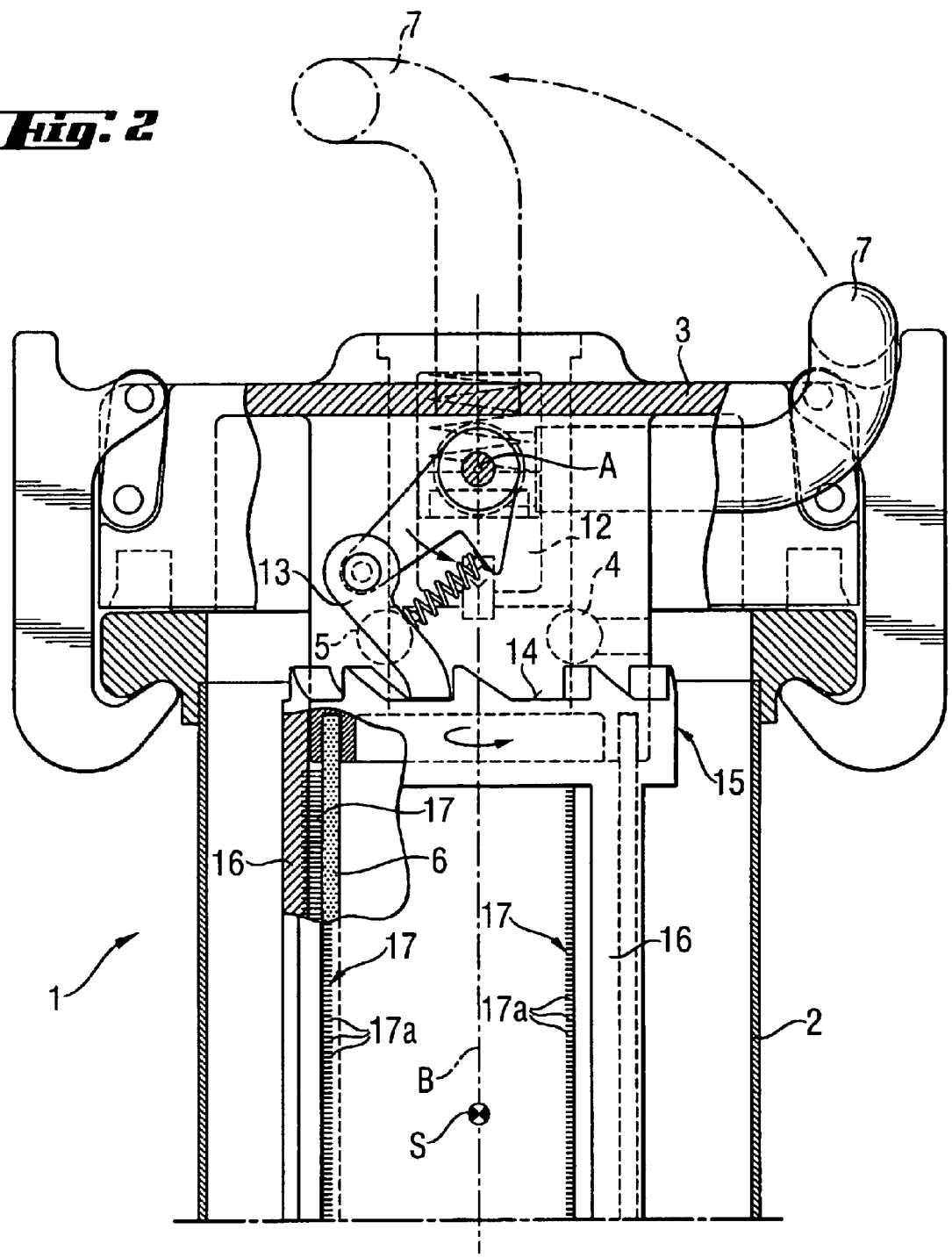

The exemplary embodiment of the invention will now be more completely described with reference to the drawings, wherein:

FIG. 1 shows a side view of a portable drilling water filter according to the invention; and FIG. 2 shows an internal view of the drilling water filter in cross-section and in partial sections according to the invention.

DETAILED DESCRIPTION OF THE INVENTION

According to FIG. 1, a drilling water filter 1, in a filter holder 2 having a cover 3, has a filter element 6 that can be inserted in the flow arm between an inflow 4 and an outflow 5 for separation of solid material from the fluid. The cover 3 for transporting the drilling water filter 1 has a displaceable carrying handle 7 that is configured as a rotationally pivotable stirrup handle, which can be swung away from the center of gravity S of the drilling water filter 1. A controlling means 8 is connected with the carrier handle axis A in a non rotating manner, wherein a permanent magnet 9 is arranged next to a Hall sensor 10, which effects a back-flushing of the filter element 6 with fluid from a pressure-biased back-flush chamber 12, via an electrically controllable back-flush valve 11.

According to FIG. 2, on the inside of the cover 3, the controlling means 8 further comprises a driving means 13 in the form of a spring biased detent mechanism, which mechanically and rotationally displacing engages into circumferential detent recesses 14 of a stepwise rotationally displaceable cleansing means 15 moving rotationally stepwise around the filter element axis B and which is configured as a brush 17 rotating coaxially on the outside of the cylinder sleeve of the filter element 6, said brush having three brush carriers 16 displaced circumferentially at 120° having inwardly oriented bristles 17a.

What is claimed is:

1. A drilling water filter with a filter container (2), a cover (3) and a filter element (6) that can be inserted in a flow arm between an inlet (4) and an outlet (5) for separating solid material from the fluid, wherein the cover (3) has a displaceable carrying handle (7) for transporting the drilling water filter, said carrying handle being connected with at least one self-cleaning means, wherein the carrying handle (3) can be pivoted away from the center of gravity.

2. The drilling water filter of claim 1, wherein the carrying handle (3) is a rotationally pivotable stirrup grip.

3. The drilling water filter of claim 2, wherein a controlling means (8) is connected to a rotationally displaceable carrying handle axis (A) in a non-rotating manner, said controlling means (8) is controllably connected with at least one self-cleaning means.

4. The drilling water filter of claim 3, wherein a permanent magnet (9) is arranged in the controlling means (8), said permanent magnet (9) having an associated Hall sensor (10) that effects a back-flushing of the filter element (6) with fluid from a pressure-biased back-flushing chamber (12), via an electrically controllable back-flush valve (11).

5. The drilling water filter of claim 4, wherein the controlling means (8) has a driving means (13) that mechanically drives a cleansing means (15).

6. The drilling water filter of claim 5, wherein the driving means (13) is a spring biased detent mechanism that mechanically and rotationally displacing engages into circumferential detent recesses (14) of the cleansing means (15).

7. The drilling water filter of claim 3, wherein the cleansing means (15) is a brush (17) that is coaxial and rotational positioned on the external cylinder sleeve of the filter element (6) having inward oriented bristles (17a).

* * * * *